(12) United States Patent
Yokoyama et al.

(10) Patent No.: US 11,472,420 B2
(45) Date of Patent: Oct. 18, 2022

(54) MACHINE LEARNING DEVICE AND MACHINE LEARNING SYSTEM (71) Applicant: Toyota Jidosha Kabushiki Kaisha, Toyota (JP)

(72) Inventors: Daiki Yokoyama, Gotemba (JP); Yohei Hareyama, Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/405,390

(22) Filed: Aug. 18, 2021

(65) Prior Publication Data
US 2022/0055635 A1 Feb. 24, 2022

(30) Foreign Application Priority Data

Aug. 20, 2020 (JP) .............................. JP2020-139396

(51) Int. Cl.
*B60W 50/00* (2006.01)
*G06N 3/063* (2006.01)
*B60W 50/06* (2006.01)

(52) U.S. Cl.
CPC ........ *B60W 50/0097* (2013.01); *B60W 50/06* (2013.01); *G06N 3/063* (2013.01); *B60W 2050/0002* (2013.01); *B60W 2050/0075* (2013.01)

(58) Field of Classification Search
CPC ............. B60W 50/0097; B60W 50/06; B60W 2050/0002; B60W 2050/0075; G06N 3/063
See application file for complete search history.

(56) References Cited

U.S. PATENT DOCUMENTS 6,546,321 B1* 4/2003 Ohkubo .............. F02D 41/2493
714/10
2015/0015389 A1* 1/2015 McIntyre ............ B60C 23/0479
340/447
(Continued)

FOREIGN PATENT DOCUMENTS

CN 110996286 A 4/2020
JP H11-082137 A 3/1999
(Continued)

OTHER PUBLICATIONS

U.S. Appl. No. 17/690,725, filed Mar. 9, 2022, Inventors: Daiki Yokoyama et al.
(Continued)

*Primary Examiner* — Yazan A Soofi
*Assistant Examiner* — Naeem Taslim Alam
(74) *Attorney, Agent, or Firm* — Dinsmore & Shohl LLP (57) ABSTRACT

The machine learning device includes a predicting part configured to use a machine learning model to predict predetermined information, an updating part configured to update the machine learning model, and a part information acquiring part configured to detect replacement of a vehicle part and acquire identification information of the vehicle part after replacement. The updating part is configured to receive a new machine learning model trained using training data sets corresponding to the vehicle part after replacement from a server and apply the new machine learning model to the vehicle, if a vehicle part relating to input data of the machine learning model is replaced with a vehicle part of a different configuration.

3 Claims, 5 Drawing Sheets

(56) References Cited

U.S. PATENT DOCUMENTS

| | | |
|---|---|---|
| 2018/0182187 A1 | 6/2018 | Tong et al. |
| 2018/0216557 A1* | 8/2018 | Klein ................... F16H 7/1281 |
| 2019/0197795 A1 | 6/2019 | Mondello et al. |
| 2019/0205765 A1* | 7/2019 | Mondello ............ G05D 1/0221 |
| 2019/0215339 A1* | 7/2019 | Chen ................... H04L 63/1425 |
| 2019/0311262 A1 | 10/2019 | Nagasaka et al. |
| 2020/0125930 A1* | 4/2020 | Martin .................. G06V 20/56 |
| 2020/0143607 A1 | 5/2020 | Kitagawa et al. |
| 2020/0241543 A1 | 7/2020 | Huger et al. |
| 2020/0394407 A1 | 12/2020 | Shimazu et al. |
| 2021/0312567 A1 | 10/2021 | Hayward et al. |
| 2022/0058463 A1 | 2/2022 | Yokoyama et al. |
| 2022/0109727 A1 | 4/2022 | Kishino et al. |
| 2022/0161815 A1 | 5/2022 | Van Beek et al. |

FOREIGN PATENT DOCUMENTS

| | | |
|---|---|---|
| JP | 2008-286251 A | 11/2008 |
| JP | 2019-183698 A | 10/2019 |
| JP | 2020-070774 A | 5/2020 |
| JP | 2020-119238 A | 8/2020 |
| JP | 2021-033629 A | 3/2021 |

OTHER PUBLICATIONS

U.S. Appl. No. 17/405,342, filed Aug. 18, 2021; Inventors: Daiki Yokoyama et al.

Non-Final Office Action dated Apr. 26, 2022 in U.S. Appl. No. 17/405,342, filed Aug. 18, 2021; Inventors: Daiki Yokoyama et al.

Final Office Action dated Aug. 23, 2022, to U.S. Appl. No. 17/405,342 filed Aug. 18, 2021.

Carvalho, Thyago P. et al. "A systematic literature review of machine learning methods applied to predictive maintenance." Computers & Industrial Engineering 137 (2019): 106024: pp. 1-10 (Year:2019).

Thonglek, Kundjanasith et al. "IVAA: Intelligent Vehicle Accident Analysis Sysstem." 2019 16th International Joint Conference on Computer Science Software Engineering (JCSSE). IEEE, 2019: pp. 85-90 (Year: 2019).

* cited by examiner

FIG. 5

MACHINE LEARNING DEVICE AND MACHINE LEARNING SYSTEM

FIELD

The present disclosure relates to a machine learning device and a machine learning system.

BACKGROUND

In recent years, along with the development of AI (artificial intelligence) technology, in vehicles, control using machine learning models such as neural network models has been studied. For example, in the machine learning system described in PTL 1, a neural network is used to predict the temperature of an exhaust purification catalyst provided in an internal combustion engine.

In order to improve the precision of prediction of such a neural network model, it is necessary to train the neural network model in advance. For example, as described in PTL 1, the neural network model is trained in a server, and the trained neural network model is sent from the server to a vehicle.

CITATIONS LIST

Patent Literature

[PTL 1] Japanese Unexamined Patent Publication No. 2019-183698

SUMMARY

Technical Problem

In this regard, if, along with use of a vehicle, the vehicle parts become degraded or break down, the vehicle parts are replaced. Further, vehicle parts are sometimes replaced for mounting higher performance vehicle parts in a vehicle.

However, a machine learning model used in a vehicle is usually tailored to the properties of the vehicle part before replacement. Therefore, if replacement of a vehicle part causes the properties of the vehicle part to change, the precision of prediction of the machine learning model is liable to fall.

Therefore, in consideration of the above problem, an object of the present disclosure is to keep the precision of prediction of a machine learning model used in a vehicle from falling if a vehicle part is replaced.

Solution to Problem

The summary of the present disclosure is as follows.

(1) A machine learning device provided in a vehicle, comprising: a predicting part configured to use a machine learning model to predict predetermined information; an updating part configured to update the machine learning model; and a part information acquiring part configured to detect replacement of a vehicle part and acquire identification information of the vehicle part after replacement, wherein the updating part is configured to receive a new machine learning model trained using training data sets corresponding to the vehicle part after replacement from a server and apply the new machine learning model to the vehicle, if a vehicle part relating to input data of the machine learning model is replaced with a vehicle part of a different configuration.

(2) The machine learning device described in above (1), wherein the updating part is configured to transmit identification information of the vehicle part after replacement and identification information of the vehicle to the server, and the new machine learning model is a machine learning model corresponding to the identification information of the vehicle.

(3) The machine learning device described in above (1) or (2), wherein the machine learning model is a neural network model.

(4) A machine learning system comprising a server and a vehicle, wherein the server comprises: a first communication device able to communicate with the vehicle; and a control device, the vehicle comprises: a second communication device able to communicate with the server; a predicting part configured to use a machine learning model to predict predetermined information; an updating part configured to update the machine learning model; and a part information acquiring part configured to detect replacement of a vehicle part and acquire identification information of the vehicle part after replacement, the updating part is configured to transmit identification information of the vehicle part after replacement to a server, if a vehicle part relating to input data of the machine learning model is replaced with a vehicle part of a different configuration, the control device is configured to transmit a new machine learning model trained using training data sets corresponding to the vehicle part after replacement to the vehicle, and the updating part is configured to apply the new machine learning model to the vehicle.

Advantageous Effects

According to the present disclosure, it is possible to keep the precision of prediction of a machine learning model used in a vehicle from falling if a vehicle part is replaced.

DESCRIPTION OF EMBODIMENTS

Figure 1:
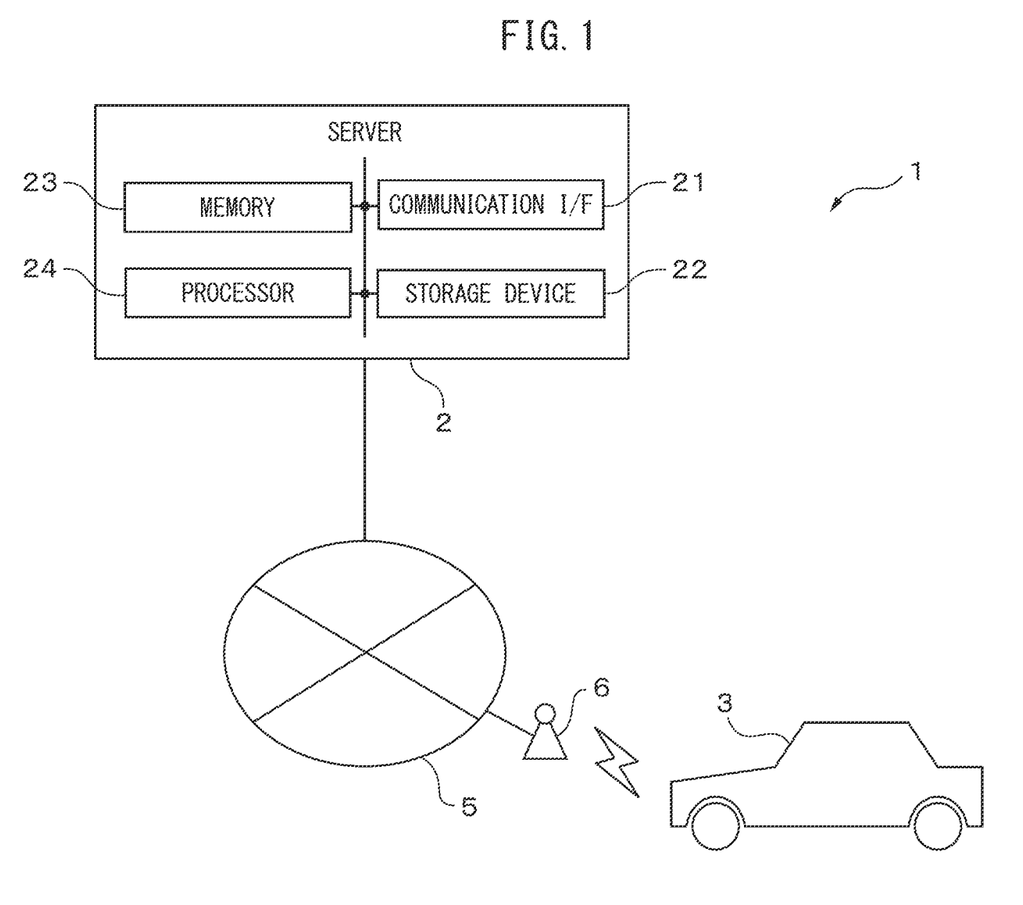
FIG. 1 is a schematic view of the configuration of a machine learning system according to an embodiment of the present disclosure.

Below, referring to the drawings, embodiments of the present disclosure will be explained in detail. FIG. 1 is a schematic view of a configuration of a machine learning system 1 according to the embodiment of the present disclosure. The machine learning system 1 is provided with a server 2 and a vehicle 3.

As shown in FIG. 1, the server 2 is provided outside of the vehicle 3 and is provided with a communication interface 21, a storage device 22, a memory 23, and a processor 24. Note that, the server 2 may be further provided with an input device such as a keyboard and mouse and an output device such as a display etc. Further, the server 2 may be configured by a plurality of computers.

The communication interface 21 can communicate with the vehicle 3 and enables the server 2 to communicate with the vehicle 3. Specifically, the communication interface 21 has an interface circuit for connecting the server 2 to the communication network 5. The server 2 communicates with the vehicle 3 through the communication interface 21, communication network 5, and wireless base station 6. The communication interface 21 is one example of a communication device.

The storage device 22, for example, has a hard disk drive (HDD), solid state drive (SSD), optical storage medium, etc. The storage device 22 stores various types of data, for example, stores computer programs for the processor 24 to perform various processing, etc.

The memory 23, for example, has a semiconductor memory such as a random access memory (RAM). The memory 23, for example, stores various data etc., used when various processing is performed by the processor 24.

The communication interface 21, the storage device 22, and the memory 23 are connected through signal wires to the processor 24. The processor 24 has one or more CPUs and peripheral circuits and performs various processing. Note that, the processor 24 may further have processing circuits such as arithmetic logic units or numerical calculation units. The processor 24 is an example of a control device.

Figure 2:
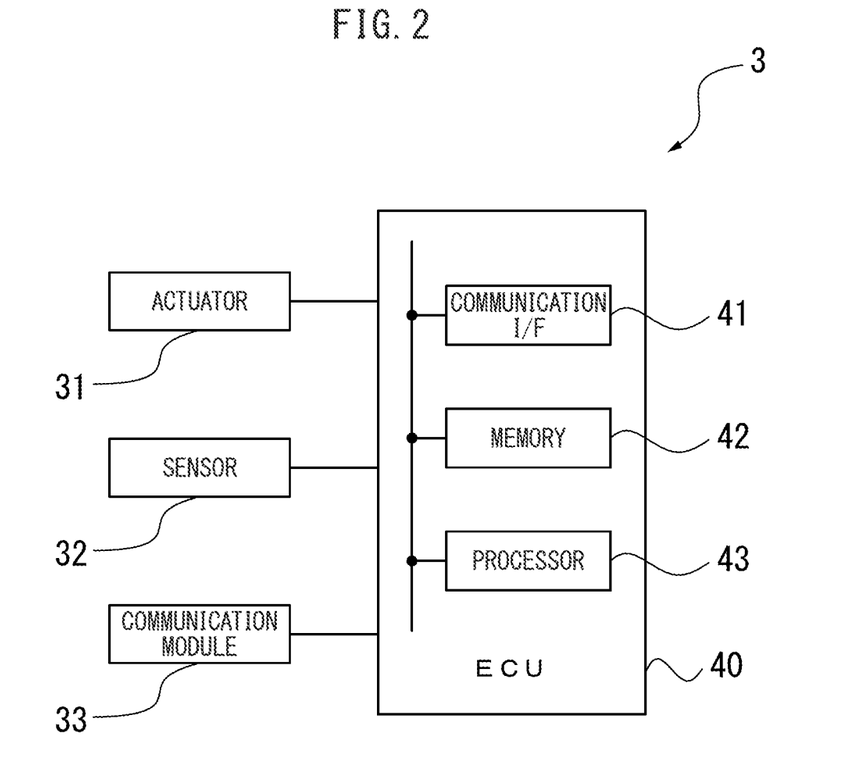
FIG. 2 is a view schematically showing a part of the configuration of a vehicle of FIG. 1.

FIG. 2 is a view schematically showing a part of the configuration of the vehicle 3 of FIG. 1. As shown in FIG. 2, the vehicle 3 is provided with actuators 31, sensors 32, a communication module 33, and an electronic control unit (ECU) 40. That is, the actuators 31, the sensors 32, the communication module 33, and the ECU 40 are mounted in the vehicle 3. The actuators 31, the sensors 32, and the communication module 33 are connected to be able to communicate with the ECU 40 through an internal vehicle network based on the CAN (Controller Area Network) or other standard.

The actuators 31 are operating parts required for the vehicle 3 to run. For example, they include parts required for operation of the internal combustion engine (spark plugs, fuel injectors, a throttle valve-drive actuator, an EGR control valve, etc.), a motor, a clutch, etc. The ECU 40 controls the actuators 31.

The sensors 32 detect the states of the vehicle 3, the internal combustion engine, the battery, etc., and include a vehicle speed sensor, a GPS receiver, an accelerator opening degree sensor, an air flowmeter, an air-fuel ratio sensor, a crank angle sensor, a torque sensor, a voltage sensor, a temperature sensor, etc. The outputs of the sensors 32 are sent to the ECU 40.

The actuators 31 and the sensors 32 constitute vehicle parts mounted in the vehicle 3. In other words, the vehicle parts include the actuators 31 and the sensors 32.

The communication module 33 is a device enabling communication between the vehicle 3 and the outside of the vehicle 3. The communication module 33, for example, is a data communication module (DCM) able to communicate with a communication network 5 through a wireless base station 6. Note that, as the communication module 33, a mobile terminal (for example, a smart phone, a tablet terminal, a WiFi router, etc.,) may be used. The communication module 33 is one example of a communication device.

The ECU 40 includes a communication interface 41, a memory 42, and a processor 43 and performs various control operations of the vehicle 3. Note that, in the present embodiment, a single ECU 40 is provided, but a plurality of ECUs may be provided for the different functions.

The communication interface 41 is an interface circuit for connecting the ECU 40 to an internal vehicle network based on the CAN or other standard. The ECU 40 communicates with other vehicle-mounted devices through the communication interface 41.

The memory 42, for example, has a volatile semiconductor memory (for example, a RAM) and nonvolatile semiconductor memory (for example, a ROM). The memory 42 stores programs run in the processor 43, various data used when the various processings are performed by the processor 43, etc.

The processor 43 has one or more CPUs (central processing units) and their peripheral circuits and performs various processing. Note that, the processor 43 may further have processing circuits such as arithmetic logic units or numerical calculation units. The communication interface 41, the memory 42 and the processor 43 are connected to each other through signal wires.

Figure 3:
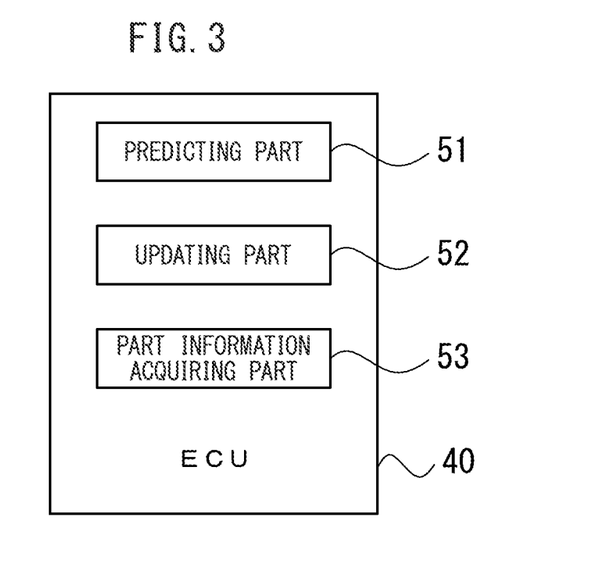
FIG. 3 is a functional block diagram of an ECU of FIG. 2.

In the present embodiment, the ECU 40 functions as a machine learning device. FIG. 3 is a functional block diagram of the ECU 40 of FIG. 2. The ECU 40 has a predicting part 51, an updating part 52, and a part information acquiring part 53. The predicting part 51, the updating part 52, and the part information acquiring part 53 are functional blocks realized by a program stored in the memory 42 of the ECU 40 run by the processor 43 of the ECU 40.

The predicting part 51 predicts predetermined information using a machine learning model. The updating part 52 updates the machine learning model used in the vehicle 3. In the present embodiment, as the machine learning model, a neural network model outputting at least one output data (which is also called "a target variable") from a plurality of input data (which are also called "explanatory variables") is used.

Figure 4:
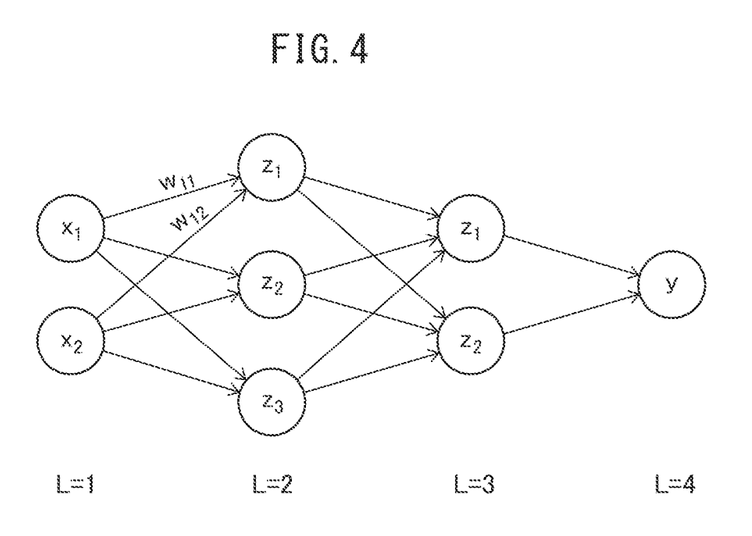
FIG. 4 shows one example of a neural network model having a simple configuration.

First, referring to FIG. 4, a neural network model will be explained in outline. FIG. 4 shows one example of a neural network model having a simple configuration.

The circle marks in FIG. 4 show artificial neurons. An artificial neuron is usually called a "node" or "unit" (in this Description, called a "node"). In FIG. 4, L=1 indicates an input layer, L=2 and L=3 indicates hidden layers, and L=4 indicates an output layer. Note that, the hidden layers are also called "intermediate layers".

In FIG. 4, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 4, the total input values $u_k^{(L=2)}$ calculated at the nodes shown by $z_k^{(L=2)}$ (k=1, 2, 3) of the hidden layer (L=2) become as in the following equation (M is the number of nodes of the input layer).

$$u_k^{(L=2)} = \sum_{m=1}^{M} \left( x_m \cdot w_{km}^{(L=2)} \right) + b_k \quad \text{[Equation 1]}$$

Next, this total input values $u_k^{(L=2)}$ are converted by the activation function "f" and are output as the output values $z_k^{(L=2)}$ ($=f(u_k^{(L=2)})$) from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "b" are used to calculate the total input values "u" ($=\Sigma z \cdot w + b$). The total input values "u" are similarly converted by an activation function and are output from the nodes of the hidden layers (L=3) as the output values $z_1^{(L=3)}$ and $z_2^{(L=3)}$. The activation function is for example a Sigmoid function σ.

Further, the node of the output layer (L=4) receives as input the output values $z_1^{(L\times 3)}$ and $z_2^{(L=3)}$ of the nodes of the hidden layer (L=3). At the node of the output layer, the corresponding weights "w" and biases "b" are used to calculate the total input value "u" ($\Sigma z \cdot w + b$) or only the corresponding weights "w" are used to calculate the total input value "u" ($\Sigma z \cdot w$). For example, at the node of the output layer, an identity function is used as the activation function. In this case, the total input value "u" calculated at the node of the output layer is output as it is as the output value "y" from the node of the output layer.

The neural network model used in the vehicle 3 is stored in the memory 42 of the ECU 40 or another storage device provided at the vehicle 3. The predicting part 51 inputs values of a plurality of input data (input values) to the neural network model to thereby make the neural network model output the value of at least one output data (output value). At this time, as the values of the input data, for example, output values of the sensors 32, command values from the ECU 40 to the actuators 31, values obtained from outside the vehicle 3 through the communication module 33, values calculated at the ECU 40, etc., are used.

The predicting part 51 predicts predetermined information corresponding to the value of the output data which is output from the neural network model. The predetermined information predicted by the predicting part 51 is used for control of the vehicle 3. Note that, the neural network model may be either of a regression model and a classification model. If the neural network model is a regression model, the output data, for example, is the output torque of the internal combustion engine, the concentration of predetermined constituent in the exhaust gas (HC, NOx, etc.), the state of charge (SOC) of the battery, etc. On the other hand, if the neural network model is a classification model, the output data is, for example, a result of judgment of abnormality of a predetermined sensor 32, a result of judgment of startup of the internal combustion engine in a hybrid vehicle, etc. As input data, a state quantity correlated with the output data is suitably selected.

In order to improve the precision of this neural network model, it is necessary to train the neural network model in advance. For this reason, for example, the neural network model is trained in the vehicle production plant etc.

In training the neural network model, training data sets comprised of combinations of measured values of a plurality of input data and measured values of at least one output data corresponding to these measured values of the plurality of input data (truth data or teacher data) are used. The measured values of the input data and output data are for example acquired using an engine bench, etc., and the training data sets are created by combining the corresponding measured values.

In training the neural network model, a large number of training data sets are used and the known back propagation method is used to repeatedly update the parameters of the neural network model (weights "w" and biases "b") so that the difference between the values of the output data output by the neural network model and the measured values of the output data becomes smaller. As a result, the neural network model is trained and a trained neural network model is created. The created trained neural network model is loaded in the ECU 40 of the vehicle 3 before shipment of the vehicle 3. That is, information of the trained neural network model (structure, weights "w", biases "b", etc., of the model) is stored in the memory 42 of the ECU 40 or another storage device provided in the vehicle 3. Note that, the trained neural network model may be transmitted from the server 2 to the vehicle 3 after the vehicle 3 is shipped.

In this regard, if a vehicle part such as the actuator 31 or the sensor 32 deteriorates or breaks down along with use of the vehicle 3, the vehicle part is replaced. Further, sometimes a vehicle part is replaced in order to mount a higher performance vehicle part in the vehicle 3.

However, the neural network model loaded in the ECU 40 is tailored to the properties of the vehicle part before replacement. For this reason, if the properties of a vehicle part change due to replacement of the vehicle part, the precision of prediction of the neural network model is liable to fall.

Therefore, in the present embodiment, the part information acquiring part 53 detects replacement of a vehicle part and acquires identification information of the vehicle part after replacement. Further, if a vehicle part relating to input data of the neural network model is replaced with a vehicle part of a different configuration, the updating part 52 receives a new neural network model trained using training data sets corresponding to the vehicle part after replacement from the server 2 and applies the new neural network model to the vehicle 3.

Specifically, if a vehicle part relating to input data of the neural network model is replaced with a vehicle part of a different configuration, the updating part 52 transmits identification information of the vehicle part after replacement to the server 2. If receiving identification information of the vehicle part after replacement from the vehicle 3, the processor 24 of the server 2 transmits the new neural network model trained using training data sets corresponding to the vehicle part after replacement to the vehicle 3. If receiving the new neural network model from the server 2, the updating part 52 applies the new neural network model to the vehicle 3.

As explained above, by updating the neural network model in accordance with replacement of a vehicle part, it is possible to keep the precision of prediction of the neural network model used in the vehicle 3 from falling if a vehicle part is replaced.

Figure 5:
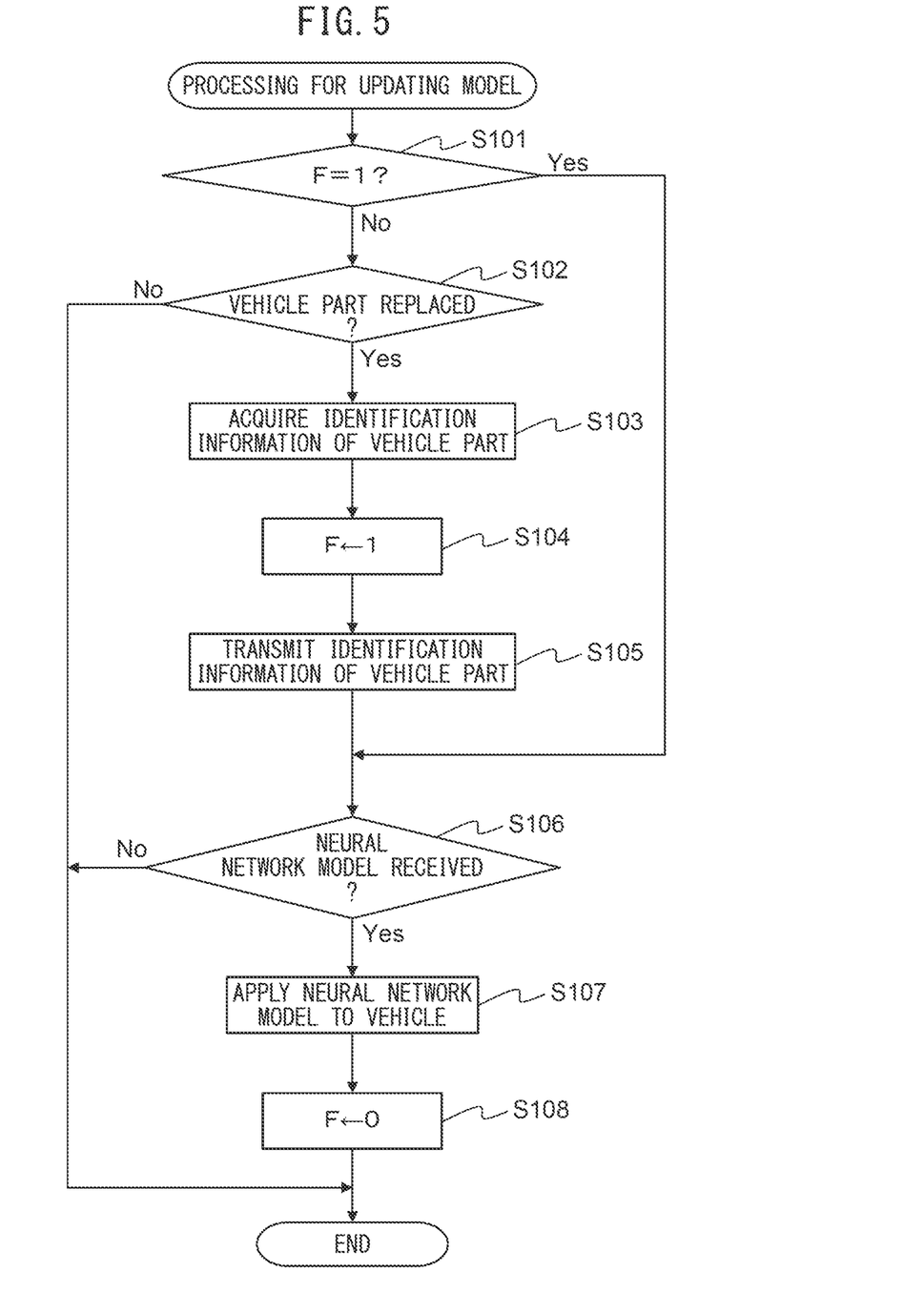
FIG. 5 is a flow chart showing a control routine of processing for updating a model.

Below, flow charts of FIG. 5 and FIG. 6 will be used to explain in detail the above control. FIG. 5 is a flow chart showing a control routine of processing for updating a model. The present control routine is repeatedly performed at predetermined run intervals by the ECU 40 of the vehicle 3.

First, at step S101, the part information acquiring part 53 judges whether a replacement flag F is "1". The replacement flag F is a flag which is set to "1" when a vehicle part is replaced. The initial value of the replacement flag F is zero.

If at step S101 it is judged that the replacement flag F is zero, the present control routine proceeds to step S102.

At step S102, the part information acquiring part 53 judges whether a vehicle part relating to input data of the neural network model has been replaced with a vehicle part of a different configuration. For example, if an output value of the sensor 32 is used as input data of the neural network model, the sensor 32 corresponds to a vehicle part relating to input data of the neural network model. Further, if a command value from the ECU 40 to the actuator 31 is used as input data of the neural network model, the actuator 31 corresponds to a vehicle part relating to input data of the neural network model. Further, a "vehicle part of a different configuration" includes a vehicle part of a different manufacturer, part number, model number, etc., than the vehicle part before replacement.

The part information acquiring part 53, for example, reads the identification information of the vehicle part (manufacturer's name, model number, serial number, manufacturing number, etc.,) to detect replacement of a vehicle part. Further, the part information acquiring part 53 may detect an output waveform, an operating voltage, etc., of a vehicle part to detect replacement of a vehicle part. Further, a worker may input replacement of a vehicle part to an input device (HMI etc.) of the vehicle 3, and the part information acquiring part 53 may detect replacement of a vehicle part based on input to the input device.

If at step S102 it is judged that a vehicle part has not been replaced, the present control routine ends. On the other hand, if at step S102 it is judged that a vehicle part has been replaced, the present control routine proceeds to step S103. At step S103, the part information acquiring part 53 acquires the identification information of the vehicle part.

Next, at step S104, the part information acquiring part 53 sets the replacement flag F to "1".

Next, at step S105, the updating part 52 transmits the identification information of the vehicle part after replacement to the server 2 through the communication module 33, the wireless base station 6, and the communication network 5.

After step S105, the present control routine proceeds to step S106. On the other hand, if at step S101 it is judged that the replacement flag F is "1", the present control routine skips step S102 to step S105 and proceeds to step S106.

At step S106, the updating part 52 judges whether it has received a new neural network model from the server 2. If it is judged that it has not received a new neural network model, the present control routine ends. On the other hand, if it is judged that it has received a new neural network model, the present control routine proceeds to step S107.

At step S107, the updating part 52 applies the new neural network model to the vehicle 3. In other words, the updating part 52 updates the neural network model used in the vehicle 3 to the new neural network model. That is, the information on the neural network model stored in the memory 42 of the ECU 40 or another storage device is rewritten.

Next, at step S108, the updating part 52 sets the replacement flag F to zero. After step S108, the present control routine ends.

Figure 6:
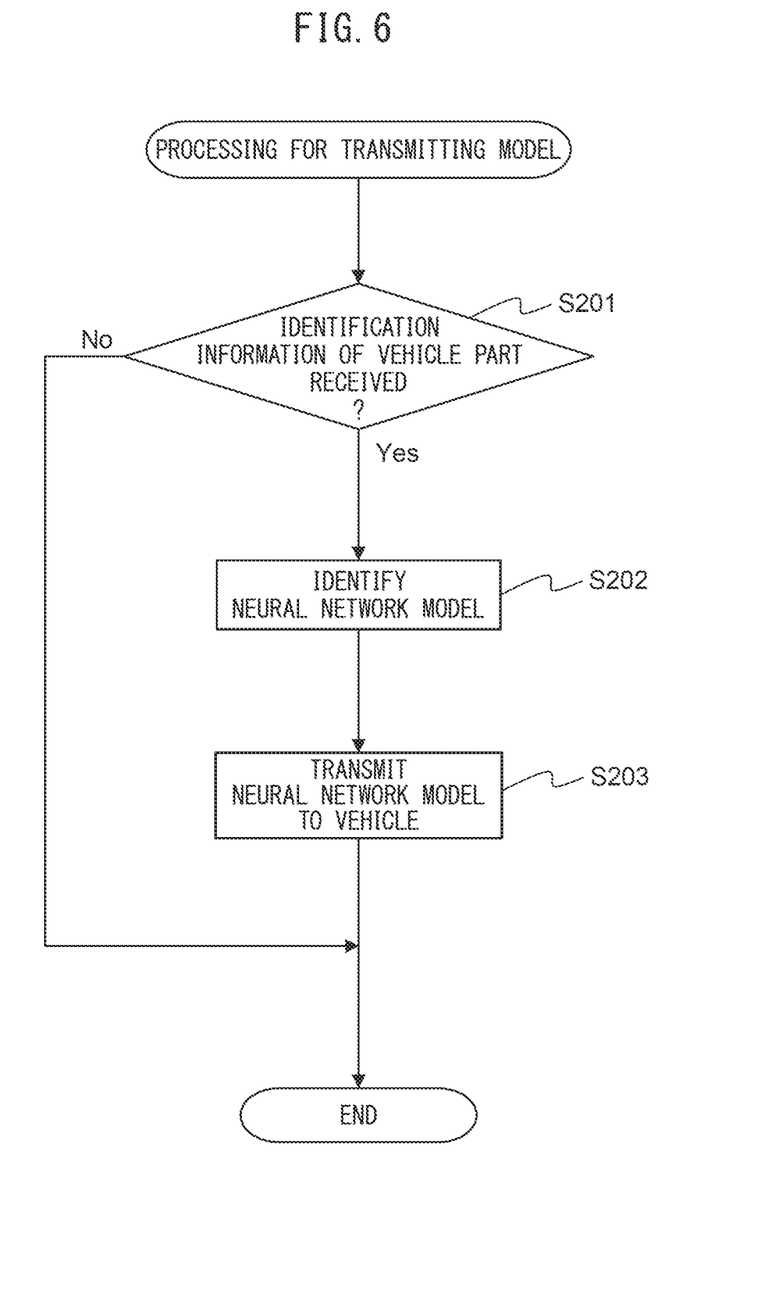
FIG. 6 is a flow chart showing a control routine of processing for transmitting a model.

FIG. 6 is a flow chart showing a control routine of processing for transmitting a model. The present control routine is repeatedly performed at predetermined run intervals by the processor 24 of the server 2.

First, at step S201, the processor 24 judges whether it has received identification information on a vehicle part from the vehicle 3. If it is judged that it has not received identification information on a vehicle part, the present control routine ends. On the other hand, if it is judged that it has received identification information on a vehicle part, the present control routine proceeds to step S202.

At step S202, the processor 24 identifies the vehicle part after replacement based on the identification information of the vehicle part and identifies the neural network model corresponding to the vehicle part after replacement. Specifically, the processor 24 extracts a neural network model trained using training data sets corresponding to the vehicle part after replacement from the plurality of neural network models stored in the storage device 22 of the server 2. In the training data set corresponding to the vehicle part after replacement, the output value of the vehicle part after replacement, the command value to the vehicle part after replacement, etc., is used as one of the measured values of the input data.

Next, at step S203, the processor 24 transmits the new neural network model identified at step S202 to the vehicle 3. After step S203, the present control routine ends.

Note that, at step S105 of FIG. 5, the updating part 52 may transmit the identification information of the vehicle part after replacement and the identification information of the vehicle 3 (vehicle name, model, etc.) to the server 2 and, at step S203 of FIG. 6, the processor 24 of the server 2 may transmit, as a new neural network model, a neural network model corresponding to the identification information of the vehicle part after replacement and the identification information of the vehicle 3 to the vehicle 3. By doing this, it is possible to apply a neural network model better suited to the properties of the vehicle 3 to the vehicle 3 and in turn possible to better keep the precision of prediction of the neural network model from falling.

In this case, the identification information of the vehicle 3 is stored in the memory 42 of the ECU 40 etc., in advance. Further, at the server 2, a neural network model created for each type of vehicle, for example, a neural network model trained using training data sets created from measured values of input data and output data acquired using an engine bench etc., prepared for each of the types of vehicles, is stored in advance in the storage device 22 of the server 2.

Above, embodiments according to the present disclosure were explained, but the present disclosure is not limited to these embodiments and can be corrected and changed in various ways within the language of the claims. For example, the machine learning model used in the vehicle 3 may be a machine learning model other than a neural network such as a random forest, a k-nearest neighbor method, a support vector machine, etc.

REFERENCE SIGNS LIST 1 machine learning system
2 server
21 communication interface
24 processor
3 vehicle
33 communication module
40 electronic control unit (ECU)
51 predicting part
52 updating part
53 part information acquiring part

The invention claimed is:

1. A machine learning device provided in a vehicle, comprising a processor configured to:
control actuators of the vehicle;
predict predetermined information with a machine learning model;

update the machine learning model;

detect an electronic signal indicative of a replacement of a first vehicle part;

acquire identification information of a second vehicle part which is installed instead of the first vehicle part after the replacement; and receive a new machine learning model trained using training data sets corresponding to the second vehicle part after the replacement from a server and apply the new machine learning model to the vehicle, in response to the first vehicle part relating to input data of the machine learning model having a different configuration than the second vehicle part.

2. The machine learning device according to claim 1, wherein the processor is configured to transmit the identification information of the second vehicle part after replacement and identification information of the vehicle to the server, and the new machine learning model is a machine learning model corresponding to the identification information of the vehicle.

3. The machine learning device according to claim 1, wherein the machine learning model is a neural network model.

* * * * *